Oct. 28, 1969  H. MEYER  3,474,527
METHOD OF TREATING INSULATION OF ELECTRIC MACHINES
Filed March 25, 1966  2 Sheets-Sheet 1

United States Patent Office
3,474,527
Patented Oct. 28, 1969

3,474,527
METHOD OF TREATING INSULATION OF ELECTRIC MACHINES
Hartmut Meyer, Berlin, Germany, assignor to Siemens Aktiengesellschaft, Erlangen, Germany, a corporation of Germany
Filed Mar. 25, 1966, Ser. No. 537,478
Claims priority, application Germany, Apr. 2, 1965, S 96,342
Int. Cl. H02k 15/00
U.S. Cl. 29—596      8 Claims

ABSTRACT OF THE DISCLOSURE

Method for impregnating and hardening, to precise dimensions, insulation containing a hardenable synthetic resin and serving to insulate winding elements of the stator of a rotary electric machine of relatively large diameter having separate sections of stator laminations, the insulation being wound onto the stator winding elements to form insulating sleeves therefor, includes impregnating the sleeves with a hardenable synthetic resin and hardening the resin impregnating the sleeves to predetermined exterior dimensions in a re-usable form which includes one section of the stator laminations subsequently serving to receive part of the stator winding elements.

---

Figure 1:
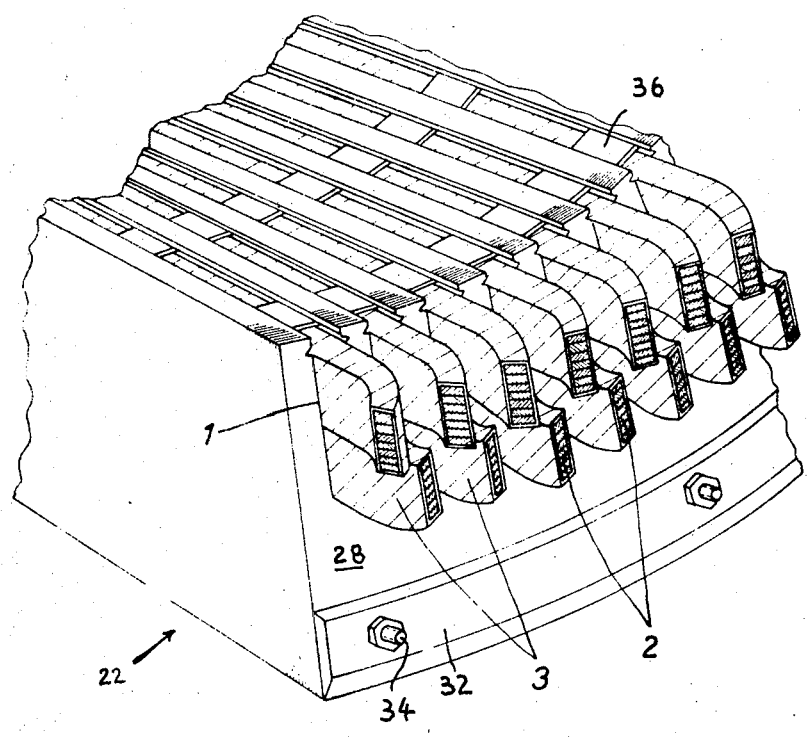

My invention relates to rotary electric machines, such as motors or generators, and in particular to rotary electric machines which are of relatively large size.

My invention deals in particular with a method for impregnating the insulation of the stator windings of such an electric machine with a hardenable, synthetic resin.

In order to insulate the windings of such electric machines it has been customary for some time to use to an increasing degree layered insulation which is impregnated with a hardenable synthetic resin. According to a known method of this type, the winding bars, which are provided with insulating sleeves wound thereon, are for example introduced into molds which are either directly evacuated or are evacuated while situated within a suitable impregnating vessel. The free space which remains in the mold is then filled with a hardenable composition of resin and hardener, which is poured into this space, and the resin which penetrates into the insulation is hardened within the mold. According to another known method, the winding bars which are provided with the insulating sleeves wound thereon are impregnated after evacuation by being submerged under pressure in large impregnating tanks provided with the hardenable composition of resin and hardener. Then the bars which are impregnated in this way are introduced into special pressure molds in which the insulation of the bars receives its exterior dimensioning, and in this way the resin which penetrates into the insulation is hardened under the action of heat.

It is also known to situate winding elements provided with insulating sleeves wound thereon but not yet impregnated within grooves of a stator or rotor of an electric machine and to then submerge the stator or rotor together with the windings in a composition of hardenable resin and hardener, the resin which penetrates into the insulation then being hardened. With this latter type of method, expensive molds are unnecessary, but because of the size of the available impregnating installations, this method is generally limited to electric machines of small diameter.

It is a primary object of my invention to provide a method for impregnating the insulation of the windings of relatively large electric machines without requiring the use of special molds.

It is in particular an object of my invention to provide a method for impregnating the insulation of stator windings, particularly winding bars or half-coiled windings, of relatively large electric machines in which the stator laminations are divided into separate sections.

It is also an object of my invention to use for the impregnating of the insulation a structure which is capable of repeated use with a plurality of sets of windings.

The objects of my invention also include a method which does not require any special impregnating molds.

Also, it is an object of my invention to utilize to advantage in the method the structure of the stator of the electric machine.

Moreover, it is an object of my invention to provide a method which can be used with even the largest rotary electric machines for the purpose of impregnating the insulation of the stator windings thereof in a highly precise manner.

A particular advantage of the method of my invention resides in the fact that particularly with relatively large electric machines it is possible to achieve the required accuracy of the impregnating and hardening mold from the original laminations of the stator, so that no particular working of mold strips and the like is required. A further particular advantage achieved with the method of my invention resides in the fact that where the stator laminations are subdivided into separate sections, as is in any event required for transportation of relatively large machines, it is possible to impregnate the insulation of the winding elements of these machines, which are subjected to the stresses of high potential, with the hardenable resin in a very precise manner.

Thus, in order to carry out the method of my invention, it is of particular advantage to use a completely assembled section of the stator laminations as an impregnating and hardening mold, this section of the stator laminations having grooves to receive the winding elements and in some cases also suitable supports for the winding elements. Within the grooves of such a section of stator laminations it is possible to impregnate all of the winding elements of the stator winding and to harden the impregnating elements to required exterior dimensions. It is preferred to submerge the section of the stator laminations provided with the winding elements which are to be impregnated completely within an impregnating bath filled with an impregnating resin. In order to limit the hardening to the resin which penetrates into the insulation of the winding elements, the winding elements can, for example, be heated with an electric current. In general it is, however, better, in carrying out the method of my invention in a practical manner, to provide the insulating sleeves which are wound onto the winding elements with an accelerating material which reduces the reaction time required for the impregnating resin which penetrates into the insulation.

In carrying out the method of my invention the winding elements are disassembled from the section of the stator laminations in which the impregnating resin was hardened, and in order to facilitate this disassembly a means is provided for preventing sticking of the impregnated and hardened insulation to the stator laminations, this means, for example, taking the form of suitable foils or a coating of lacquer or the like which retard sticking, these foils or coatings being situated between the walls of the grooves of the section of stator laminations which serves as an impregnating and hardening mold and the winding elements which are situated in these grooves. Furthermore, it is possible to facilitate the disassembly of the winding elements, according to a further feature of my invention, by refraining from hardening the head ends of the windings.

Figure 2:
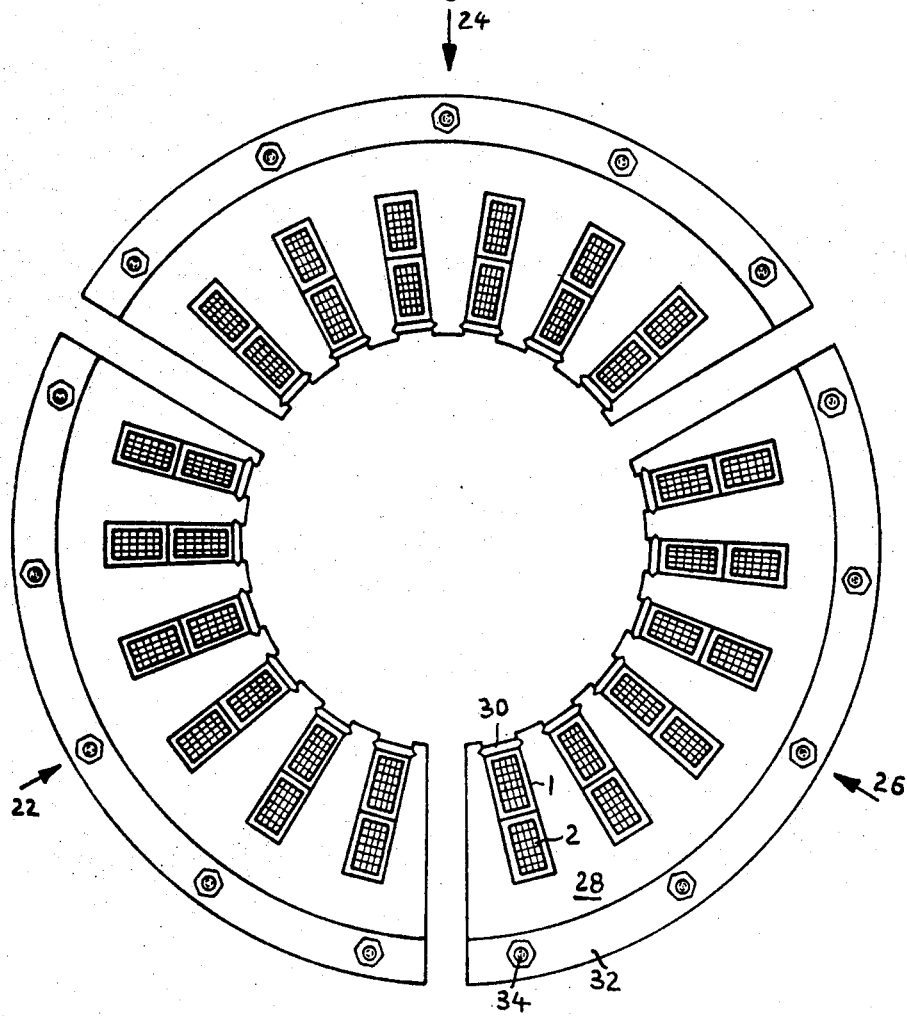

In order to more fully explain my invention, reference is made to the accompanying drawings which form part of this application and in which:

FIG. 1 is a fragmentary perspective illustration of part of a section of assembled laminations of a stator; and FIG. 2 is a schematic end view of the stator showing the individual sections of assembled stator laminations with the windings therein.

Referring first to FIG. 2, the stator schematically illustrated therein includes a plurality of stator sections 22, 24, and 26 which are separate from each other and which are individually mounted in any suitable way in the housing of the electric machine. The stator is divided into the sections 22, 24, and 26 because of the relatively large size of the machine, these separate sections rendering the manufacture and transportation of the machine far simpler and easier to carry out than if the large machine were constructed from a single stator section. In the illustrated example the three sections are spaced from each other and are assembled in the machine in the manner shown in FIG. 2 so that each section extends approximately one-third of the way around the axis of the machine. Each of the sections 22, 24, and 26 is composed of a stack of laminations 28 formed with grooves 1 which receive the winding bars 2 which are encased within insulating sleeves impregnated with a hardened resin. Retaining elements 30 have opposed V-shaped edges received in V-grooves for retaining the windings of the stator in the grooves 1 of the laminations 28. Each stack of laminations 28 is situated between a pair of end strips 32, and suitable bolt and nut assemblies 34 extend through aligned openings of the laminations and the end strips 32 for pulling the latter tightly toward each other so as to maintain the stack of laminations assembled together to form the completely assembled section.

Referring to FIG. 1, part of the section 22 is illustrated therein in greater detail than in FIG. 2, and it is to be understood that the other stator sections are constructed in the same way. Thus, FIG. 1 shows the configuration of the individual laminations 28 as well as the end clamping strips 32 and the bolt and nut assemblies 34. Within the grooves 1 of the section of laminations 28 are situated the winding bars 2 which are encased within insulating sleeves 3 in the form of elongated bands which are wound onto the winding bars in the manner indicated in FIG. 1. These insulating sleeves 3 are wound in a known way from mica bands consisting of layers of mica carried by a heat-resistant base material. These mica layers, which may take the form of leaves of mica or of continuous mica foil, so-called mica paper, are joined to the base layer and also, in some cases, with a covering layer, by way of a hardenable, but not self-hardening, cement, glue, or the like. This adhesive material, which as a rule is introduced for mechanical stiffening of the mica band in an amount of approximately 3–7% with respect to the weight of the mica band, is chosen in such a way that it can be completely incorporated into the composition of resin and hardener which is subsequently used for impregnating the insulation. It is, however, also possible to fuse the mica layers to the base by means of a meltable carrier material.

The mica bands which are wound to form the insulating sleeves 3 also contain an accelerator for reducing the reaction time of the composition of resin and hardener which penetrates into the insulation, so that the solution which remains in the impregnating bath, in spite of the hardening of the material which impregnates the insulating sleeves 3, will have no increase in its viscosity and will therefore be suitable for use during a large number of impregnating cycles.

In order to secure the winding bars 2 within the grooves 1 of the stack of laminations 28, special shims or shim pieces can also be situated in the grooves. In particular, the V grooves which subsequently receive the retaining elements 30 can receive these strips which prevent the bars introduced into the grooves from falling out of the latter. These strips need not, however, extend along the entire lengths of the grooves, since it is in general sufficient to provide relatively short pieces at individual locations, such as the pieces 36 shown in FIG. 1.

After the winding bars 2, encased within the wound insulating sleeves 3, are introduced into the grooves of a section of laminations 28, such as the section 22 shown in FIG. 1, this section is introduced into the impregnating apparatus in which the bars are first dried in a vacuum and then impregnated with a hardenable impregnating resin. The section of stator laminations remains in the impregnating apparatus until the impregnating resin, which penetrates into the insulating sleeves 3, is fully hardened, so that a subsequent treatment, particularly a subsequent hardening, becomes unnecessary after removal of the section of stator laminations from the impregnating apparatus. After removal of the section of stator laminations from the impregnating apparatus, the excess impregnating resin flows away from the remaining regions of the section of laminations while the part of the impregnating resin which has penetrated into the insulation 3 is fully hardened.

Inasmuch as the bars 2 together with the insulating sleeves 3 are situated in the grooves 1 of the stator laminations during the complete hardening of the resin, the hardening takes place in the manner providing precisely dimensioned exterior surfaces for the insulated windings without requiring a special impregnating and hardening form. The bars are then disassembled from the stack of laminations, and now the stack of laminations is again used to manufacture precisely hardened winding bars of a second series of bars of the same windings. In this way a plurality of series of winding bars are manufactured in the same way one after the other in the same section of the stator laminations, so that when the last of the plurality of series of bars is treated in accordance with my invention it need not be disassembled but instead can remain in the section of the stator laminations which is then rejoined with the other sections in the housing of the machine, to form a stator as schematically illustrated in FIG. 2.

Inasmuch as the manufacture of the insulated windings according to my invention requires disassembly of a number of winding bars from the section of stator laminations which serves as an impregnating and hardening form, it is preferred, prior to introducing the winding bars into the grooves 1, to prevent sticking or caking of the bars 2 onto the laminations by introducing into the grooves between the surfaces thereof and the winding bars foils which will prevent such sticking or caking, such as foils of polyethylene glycol terephthalate, for example. If desired, however, it is possible in some cases to provide the surfaces which define the grooves 1 or the exterior surfaces of the insulating sleeves 3 with a coating of lacquer or the like which also functions in the same way to prevent sticking. By the introduction of such foils or by the provision of such a coating of lacquer on the insulating sleeves, the penetration of the impregnating resin is not retarded in any way since the impregnating resin, as a result of the vacuum impregnation, can flow into the insulating sleeves 3 to a sufficient extent through the end surfaces thereof.

As has already been mentioned, the mica bands which are wound to form the insulating sleeves 3 contain an accelerator which reduces the reaction time of the resin-hardener composition used for the impregnating resin. If, for example, the impregnating resin which is used is a hardenable mixture of unsaturated polyester resins, monomers capable of reacting therewith, and organic peroxides, then the mica bands are provided with a material which reduces the polymerization reaction time and which is adapted to the particular organic peroxide which is used. For the above compositions which are capable of carrying out the polymerization reactions, the accelerators which will reduce the reaction time can be, for example, a mixed aliphatic-aromatic tertiary amine or an oxygentransferring metal salt. Examples of tertiary aliphatic-aromatic amines are dimethyl-p-toludine compounds which contain a plurality of these groups in molecules, such as, for example, 4,4',4''-dimethylaminotriphenyl carbinol. An example of a suitable metal salt is cobalt stearate.

It is also possible to use as the impregnating resin compositions which harden my a poly addition reaction. Examples of the latter are epoxy-resin-hardener mixtures with acid anhydride hardeners. For these resin-hardener mixtures, the mica bands may be provided, in order to accelerate the poly addition reaction with a compound having a basis of tertiary amine. If, however, the mica bands are cemented with a hardener-free epoxy compound as the cementing medium, then care must be taken to see to it that the composition used as an accelerator will indeed accelerate the poly-addition reaction heat-hardening epoxy resin hardening composition but will not start the ionic polymerization of the epoxy compound, so that a sufficiently long life, as required by the practice, will be achieved for the mica bands. In this case it is preferred, as has already been proposed, to use in the mica band as an accelerator di- or poly-tertiary mixed aliphatic aromatic amines, in which the amine nitrogen is directly bound to the aromatic system. For examples, suitable compounds of this type are 4,4'-dimethylaminodiphenyl methane, 4,4'-dimethylaminotriphenyl methane, 4,4',4''-dimethylaminotriphenyl carbinol or 4,4'-dimethylaminobenzophenone.

In the case where an expoxy-resin-hardener system is used as the impregnating resin and the mica bands are cemented with compositions which can be bound by carboxyl groups or hydroxyl groups or even sulfhydryl groups in the heat-hardenable epoxy-resin hardener mixture, it is possible to use as an accelerator other tertiary amines, such as, for example, benzyldimethylamine, triethanolamines, N-methylmorpholine or N-β-oxyethylmorpholine, as has also been already proposed.

In order to prevent washing away of the accelerator compound which during penetration of the impregnating resin into the insulating sleeves 3 is situated in the insulating sleeves in order to reduce the reaction time of the impregnating resin, it is preferable to use a compound which is not readily soluble in the penetrating impregnating composition, as also has been already proposed and as is the case with the compounds mentioned in the above examples. By "not readily soluble" is meant that the dissolving of the compound or the resin mixed therewith into the penetrating reacting composition which serves as the impregnating resin requires a substantially longer period of time than the penetrating of the reacting impregnating composition into the insulating sleeves 3. The dissolving time itself, however, requires only a considerably shorter time than the gelling or hardening time of the impregnating resin after the latter has penetrated into the insulating sleeves.

I claim:

1. In a method for impregnating and hardening to precise dimensions insulation containing a hardenable synthetic resin which insulates winding elements of the stator of a rotary electric machine of relatively large diameter which has separate sections of stator laminations and in which the insulation is wound onto the stator winding elements to form insulating sleeves therefor, at least once performing the steps of assembling with one of the sections of stator laminations several stator winding elements with the insulating sleeves wound thereon into an assembly, immersing said assembly in an impregnating bath having therein a solution of hardenable synthetic resin which impregnates the insulation, the one section of stator laminations serving as a mold for determining the exterior dimensions of the impregnated and hardened insulation, removing said assembly from said impregnating bath after the impregnating resin has hardened to a given degree and disassembling the winding elements together with their insulation, which has thus been impregnated with the synthetic resin that has been hardened, from the one section of stator laminations, and having performed said steps at least once, finally treating several additional stator winding elements in accordance with the foregoing steps so as to impregnate the insulation of the additional stator winding elements with the synthetic resin that is hardened, and maintaining said additional stator winding elements assembled with said one section of stator laminations to serve as such as a component of an electric machine.

2. A method as recited in claim 1 and wherein said impregnating and hardening are carried out in a mold formed by a single completely assembled section of the stator laminations formed with grooves which receive the insulated stator winding elements.

3. A method as recited in claim 2 and wherein only the section of the stator laminations which carries the insulated winding elements which are to be impregnated is immersed, in order to be impregnated, completely within an impregnating bath which is filled with the impregnating resin.

4. The method of claim 3 and wherein the insulation sleeves only are provided, prior to immersion in the impregnating bath, with an accelerator material which reduces the reaction time of the impregnating resin.

5. A method as recited in claim 2 and wherein prior to impregnation of the insulation a means is situated between the grooves of the section of stator laminations and the insulated windings received therein for facilitating removal of the insulated windings after impregnation by and hardening of the resin, said means preventing sticking of the finished impregnated and hardened insulating sleeves to the mold formed by the section of stator laminations.

6. A method as recited in claim 2 and wherein the winding elements have head ends which are not hardened so as to facilitate removal of the winding elements from the mold formed by the section of stator laminations.

7. A method as recited in claim 3 and wherein the insulation is hardened within the impregnating bath to such an extent as to dispense with subsequent treatment outside of the impregnating bath, particularly for hardening purposes.

8. In a method of manufacturing a rotary electric machine of relatively large diameter which includes a stator having separate sections of laminations formed with grooves which receive insulated stator winding elements situated in insulating sleeves which are impregnated with a hardenable synthetic resin, the steps of assembling one of a plurality of series of insulated stator winding elements, prior to impregnation of the insulation thereof, with one of the sections of the stator laminations, then immersing the said one section of stator laminations and the insulated stator winding elements assembled therewith into an impregnating bath having therein a solution of hardenable synthetic resin which impregnates the insulation, said one section of stator laminations acting as an impregnating and hardening mold which determines the exterior dimensions of the impregnated and hardened insulation, removing the said one section of stator laminations with the insulated winding elements from the impregnating bath after the impregnating resin has hardened to a given degree, then disassembling the winding elements together with their insulation, which has thus been impregnated with a synthetic resin which has also been hardened, from said one section of stator laminations and introducing into the latter the next series of stator winding elements, then repeating the above steps until said next series of stator winding elements have been treated in the same way as the immediately preceding series of stator winding elements, and so on until the last series of stator winding elements has its insulation impregnated with a synthetic resin which is hardened, maintaining the last series of stator winding elements assembled with said one section of stator laminations, and then returning said one section of stator laminations to the stator of the electric machine to serve as a component thereof.

References Cited

UNITED STATES PATENTS

| | | | |
|---|---|---|---|
| 2,611,930 | 9/1952 | Hill et al. | 310—208 X |
| 2,632,211 | 3/1953 | Trigg | 264—272 X |
| 2,675,421 | 4/1954 | Dexter | 9—596 X |
| 2,707,204 | 4/1955 | Richardson et al. | |
| 2,970,936 | 2/1961 | Richardson | 29—596 |
| 3,222,626 | 12/1965 | Feinberg et al. | 310—45 X |

JOHN F. CAMPBELL, Primary Examiner

C. E. HALL, Assistant Examiner

U.S. Cl. X.R.

264—250, 272; 310—42, 45